(12) United States Patent
Ganesan et al.

(10) Patent No.: US 11,582,601 B2
(45) Date of Patent: Feb. 14, 2023

(54) ZERO-TOUCH DEPLOYMENT (ZTD) OF CELLULAR IOT DEVICES AND ASSOCIATED TRUST MODEL

(71) Applicant: Cisco Technology, Inc., San Jose, CA (US)

(72) Inventors: Elango Ganesan, Portola Valley, CA (US); Michael Freed, Pleasanton, CA (US); Scott Taft Potter, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 337 days.

(21) Appl. No.: 16/868,097

(22) Filed: May 6, 2020

(65) Prior Publication Data

US 2021/0352472 A1 Nov. 11, 2021

(51) Int. Cl.
*H04W 72/04* (2009.01)
*H04W 12/04* (2021.01)
*H04L 12/46* (2006.01)
*H04W 8/18* (2009.01)
*H04W 64/00* (2009.01)
(Continued)

(52) U.S. Cl.
CPC ......... *H04W 12/04* (2013.01); *H04L 12/4633* (2013.01); *H04L 12/4641* (2013.01); *H04L 61/5007* (2022.05); *H04W 8/18* (2013.01); *H04W 12/06* (2013.01); *H04W 12/088* (2021.01); *H04W 60/00* (2013.01); *H04W 64/00* (2013.01)

(58) Field of Classification Search
CPC ... H04W 12/04; H04W 12/06; H04W 12/088; H04W 12/03; H04W 8/18; H04W 8/265; H04W 60/00; H04W 60/04; H04W 64/00; H04L 12/4633; H04L 12/4641; H04L 61/5007; H04L 63/0272; H04L 63/0823
See application file for complete search history.

(56) References Cited

U.S. PATENT DOCUMENTS 9,130,837 B2 9/2015 Bjarnason et al.
9,615,224 B2 4/2017 Dumov et al.
(Continued)

OTHER PUBLICATIONS

Pritikin, et al., "Enrollment Over Secure Transport", Request for Comments 7030, Oct. 2013, 53 pages, IETF Trust.
(Continued)

*Primary Examiner* — Mahbubul Bar Chowdhury
(74) *Attorney, Agent, or Firm* — Behmke Innovation Group; Kenneth J. Heywood; Jonathon P. Western

(57) ABSTRACT

In one embodiment, a service receives a device registration request sent by an endpoint device, wherein the endpoint device executes an onboarding agent that causes the endpoint device to send the device registration request via a cellular connection to a private access point name (APN) associated with the service. The service verifies that a network address of the endpoint device from which the device registration request was sent is associated with an integrated circuit card identifier (ICCID) or international mobile equipment identity (IMEI) indicated by the device registration request. The service identifies a tenant identifier associated with the ICCID or IMEI. The service sends, based on the tenant identifier, a device registration response to the endpoint device via the private APN.

17 Claims, 7 Drawing Sheets

(51) Int. Cl.
*H04W 12/06* (2021.01)
*H04W 60/00* (2009.01)
*H04W 12/088* (2021.01)
*H04L 61/5007* (2022.01)

(56) References Cited

U.S. PATENT DOCUMENTS

| | | | |
|---|---|---|---|
| 9,860,235 | B2 | 1/2018 | Curtis et al. |
| 10,108,435 | B2 | 10/2018 | Dumov et al. |
| 10,298,581 | B2 | 5/2019 | Shah et al. |
| 11,272,371 | B2 * | 3/2022 | Zhu ............... H04W 12/069 |
| 2009/0068999 | A1 * | 3/2009 | Chen ............... H04W 8/265 |
| | | | 455/414.2 |
| 2013/0318343 | A1 * | 11/2013 | Bjarnason ......... H04L 9/3213 |
| | | | 713/157 |
| 2016/0286459 | A1 * | 9/2016 | Enomoto ............ H04W 4/06 |
| 2016/0374134 | A1 * | 12/2016 | Kweon ............. H04W 12/06 |
| 2017/0251327 | A1 * | 8/2017 | Ostheeren .......... H04W 4/50 |
| 2018/0063714 | A1 * | 3/2018 | Stephenson ........ H04L 63/083 |
| 2018/0314808 | A1 * | 11/2018 | Casey ................ H04W 4/02 |
| 2019/0149342 | A1 * | 5/2019 | Fynaardt ........... H04L 9/0891 |
| | | | 713/156 |
| 2019/0182645 | A1 * | 6/2019 | Joseph ............... H04W 4/60 |
| 2019/0312878 | A1 | 10/2019 | Brown et al. |
| 2020/0177589 | A1 * | 6/2020 | Mangalvedkar ...... G06F 16/245 |

OTHER PUBLICATIONS

Turner, S., "EST (Enrollment Over Secure Transport) Extensions", Request for Comments 8295, Jan. 2018, 54 pages, IETF Trust.
"Enrollment Over Secure Transport", online: https://en.wikipedia.org/wiki/Enrollment_over_Secrure_Transport, Dec. 2019, 2 pages, Wikimedia Foundation, Inc.
"International Mobile Equipment Identity", online: https://en.wikipedia.org/wiki/International_Mobile_Equipment_Identity, Mar. 2020, 5 pages, Wikimedia Foundation, Inc.
"SIM Card", online: https://en.wikipedia.org/wiki/SIM_card#ICCID, Mar. 2020, 12 pages, Wikimedia Foundation, Inc.

* cited by examiner

ZERO-TOUCH DEPLOYMENT (ZTD) OF CELLULAR IOT DEVICES AND ASSOCIATED TRUST MODEL

TECHNICAL FIELD

The present disclosure relates generally to smart transportation systems, and, more particularly, to zero-touch deployment (ZTD) of cellular Internet of Things (IoT) devices and associated trust model.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

Today, the onboarding of cellular IoT devices is needlessly complex and typically requires a device to go through "staging" that requires human intervention. More specifically, onboarding of a cellular IoT device entails either customizing each device during manufacturing or requiring the end user to configure each device in the field before deployment. Customizing each device at manufacturing creates stock-keeping unit (SKU) proliferation and the associated back and forth workflow between the manufacturer and the end user. Due to the complexity of the backend process, end users often use shared secrets across devices. In addition, the secrets are often shared with the manufacturer, thereby weakening security. On the other hand, requiring that the end users configure each device before deployment, increases field deployment cost and time, decreases security, introduces human errors and increases operational complexity.

To allow mutually trusted secure operations of the IoT devices with IoT services, such as AWS IoT and Azure IoT, devices needs to be given a trust anchor (root certificates), per device secrets, Cellular APN and IoT service-related information. With embedded SIM (eSIM, or eUICC) customers are interested in choosing a service provider and downloading the respective SIM profiles during deployment as well. Enabling this level of per device customization without complex backend process and in the field customization in a secure and scalable manner is a critical problem to solve for wide deployment and adoption of (cellular connected) IoT devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
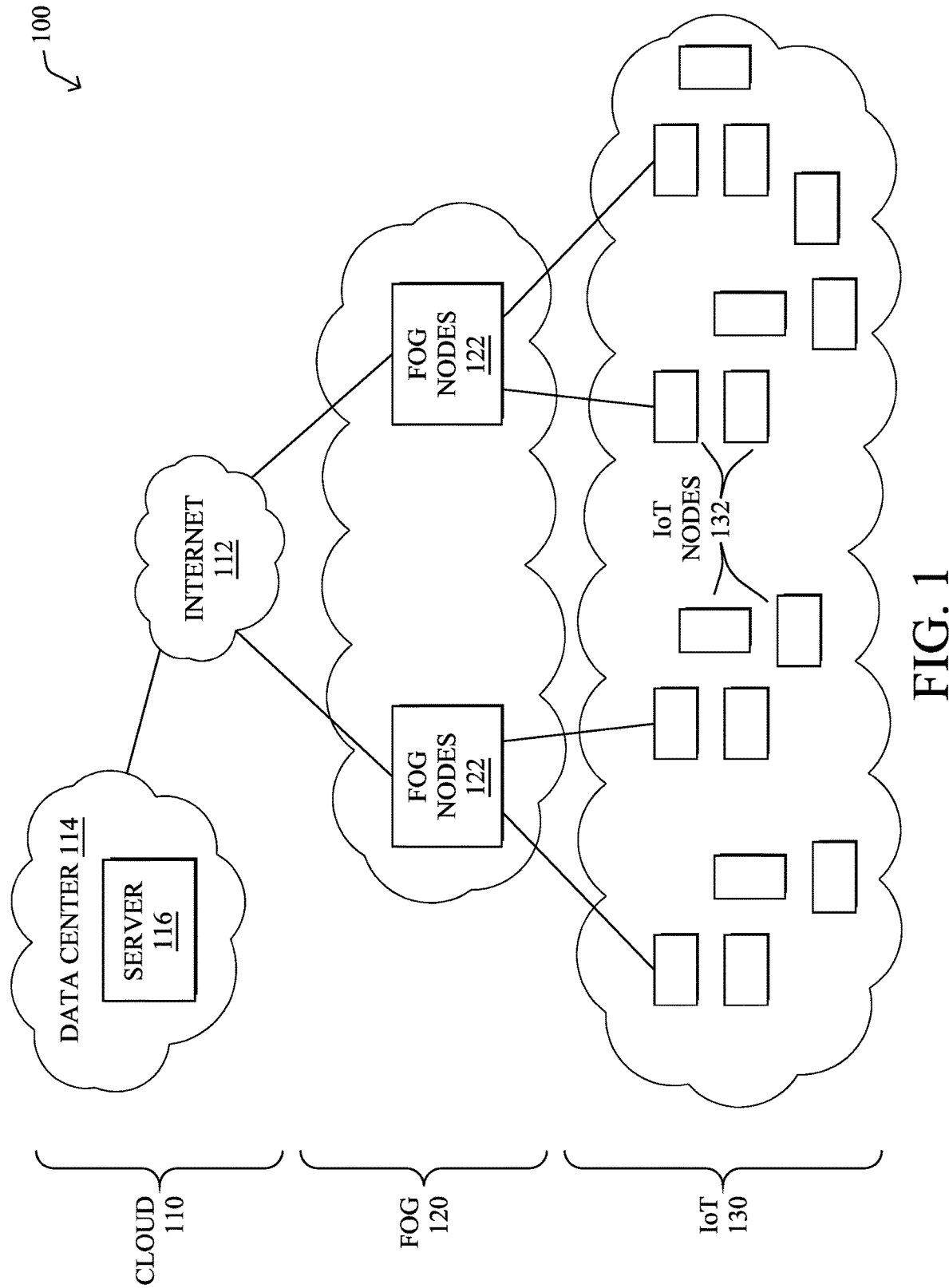
FIG. 1 illustrates an example communication network.

According to one or more embodiments of the disclosure, a service receives a device registration request sent by an endpoint device, wherein the endpoint device executes an onboarding agent that causes the endpoint device to send the device registration request via a cellular connection to a private access point name (APN) associated with the service. The service verifies that a network address of the endpoint device from which the device registration request was sent is associated with an integrated circuit card identifier (ICCID) or international mobile equipment identity (IMEI) indicated by the device registration request. The service identifies a tenant identifier associated with the ICCID or IMEI. The service sends, based on the tenant identifier, a device registration response to the endpoint device via the private APN.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified communication network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
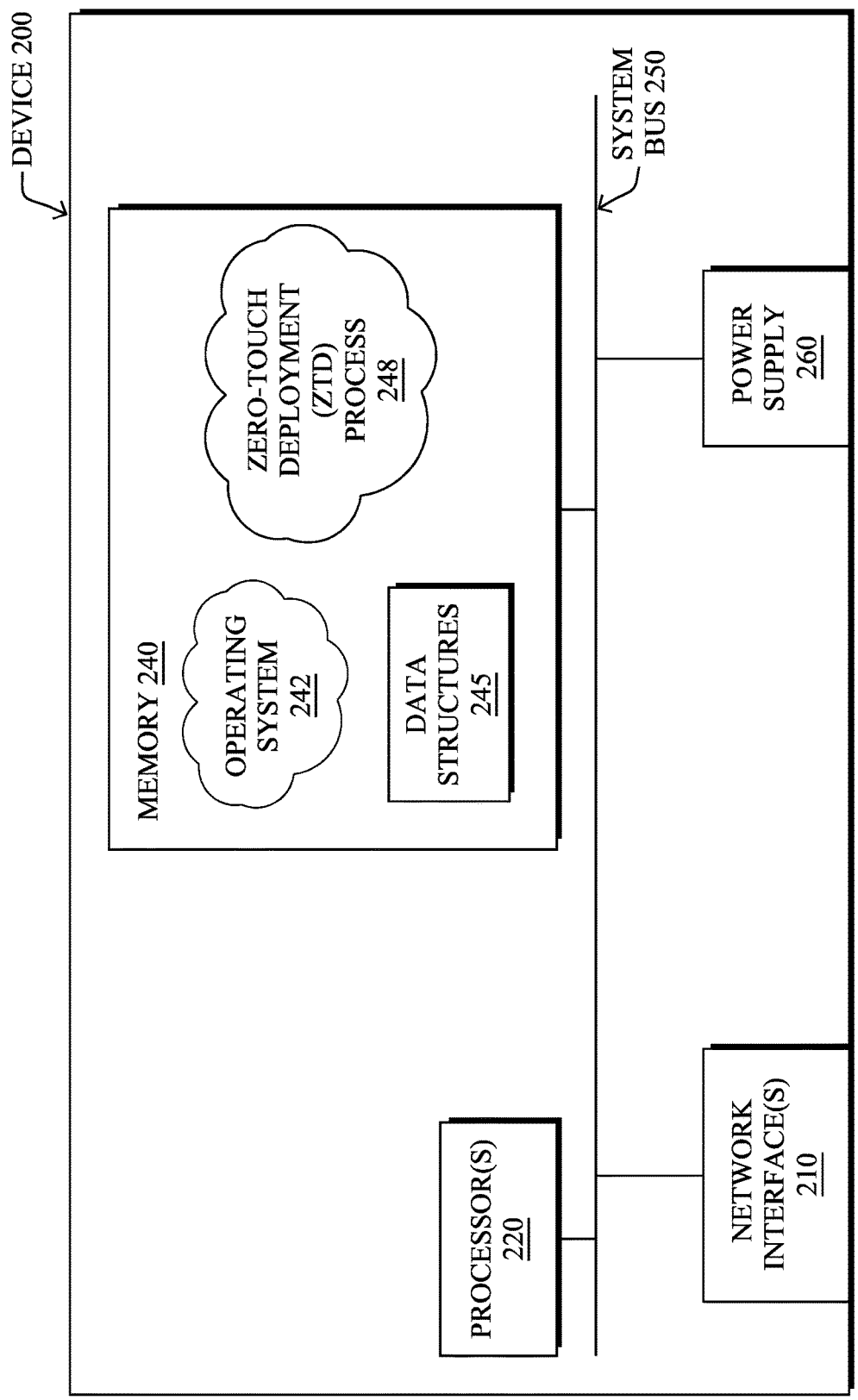
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative zero-touch deployment (ZTD) process 248, as described herein.

As noted above, today, the onboarding of cellular IoT devices is needlessly complex and typically requires a device to go through "staging" that requires human intervention. More specifically, onboarding of a cellular IoT device entails either customizing each device during manufacturing or requiring the end user to configure each device in the field before deployment. Customizing each device at manufacturing creates stock-keeping unit (SKU) proliferation and the associated back and forth workflow between the manufacturer and the end user. Due to the complexity of the backend process, end users often use shared secrets across devices. In addition, the secrets are often shared with the manufacturer, thereby weakening security. On the other hand, requiring that the end users configure each device before deployment, increases field deployment cost and time, decreases security, introduces human errors and increases operational complexity.

To allow mutually-trusted, secure operations of the IoT devices with IoT services, such as Amazon Web Services (AWS) IoT and Azure IoT, devices needs to be given a trust anchor (root certificates), per device secrets, cellular access point name (APN), and IoT service-related information. With embedded subscriber identity modules (SIMs), such as eSIM, eUICC, and the like, endpoint users are interested in choosing a service provider and downloading the respective SIM profiles during deployment, as well. Enabling this level of per-device customization without complex backend process and in the field customization in a secure and scalable manner is a critical problem to solve for wide deployment and adoption of (cellular connected) IoT devices.

Zero-Touch Deployment (ZTD) of Cellular IoT Devices and Associated Trust Model

The techniques herein introduce zero touch onboarding for cellular devices and the associated trust model, authentication mechanisms and back end security state management. Such zero-touch onboarding may include any or all of: updating the device's trust anchors, issuing deployment/end user-specific device certificates, or updating information pertaining to APNs and IoT services, to allow mutually trusted secure operations of the IoT devices with IoT services (e.g., AWS IoT, Azure IoT, the end user's own management solution, etc.). In some aspects, the techniques herein allow for this level of per device customization, automatically, based on policies and without requiring a complex backend manufacturing process or customization in the field, in a secure and scalable manner.

Specifically, according to one or more embodiments of the disclosure as described in detail below, a service receives a device registration request sent by an endpoint device, wherein the endpoint device executes an onboarding agent that causes the endpoint device to send the device registration request via a cellular connection to a private access point name (APN) associated with the service. The service verifies that a network address of the endpoint device from which the device registration request was sent is associated with an integrated circuit card identifier (ICCID) or international mobile equipment identity (IMEI) indicated by the device registration request. The service identifies a tenant identifier associated with the ICCID or IMEI. The service sends, based on the tenant identifier, a device registration response to the endpoint device via the private APN.

Illustratively, the techniques described herein may be performed by hardware, software, and/or firmware, such as in accordance with the ZTD process 248, which may include computer executable instructions executed by the processor 220 (or independent processor of interfaces 210) to perform functions relating to the techniques described herein.

Operationally, FIG. illustrates an example architecture 300 for the zero-touch deployment (ZTD) of endpoint devices, according to various embodiments. As shown, there may be any number of IoT devices 302 that are to be onboarded to a device management platform 312, such as Control Center by Cisco Systems, Inc., or the like. In various embodiments, onboarding of base stations 304 to device management platform 312 may be facilitated by a ZTD service 310 that communicates with devices 302 via a cellular network that comprises any number of base stations 304 (e.g., cell towers, etc.) and a service provider (SP) network 306 that functions as the packet core for the cellular network. As would be appreciated, while ZTD service 310 and device management platform 312 are shown as distinct entities in architecture 300, their functions may be combined or omitted, as desired, in further embodiments.

Devices 302 may include, but are not limited to, vending equipment, automation equipment, vehicles, sensors (e.g., temperature sensors, pressure sensors, humidity sensors, etc.), actuators, drones, other forms of IoT devices, and the like. In various embodiments, each device 302 may be configured to communicate via a cellular connection with a cellular network. Accordingly, each device 302 may include a subscriber identification module (SIM) card, eSIM, iSIM, or the like.

Traditionally, subscriber identification module (SIM) cards are removable cards that store the authentication information needed for a device to access a cellular network, such as its international mobile subscriber identity (IMSI) number, integrated circuit card ID (ICCID), etc. There is a well-developed procurement, deployment, and authentication process that scales to billions of cellular connected IoT devices. One aspect of the teachings herein is that this process can be leveraged to implement ZTD by using the SIM as the root of trust for purposes of bootstrapping onboarding of the device 302 to its corresponding management platform 312.

SIMs are typically owned by service providers, also called mobile network operators, and to enable switching between service providers without needing to physically swap SIM cards, eSIMs, are a relatively new technology, can be utilized. Instead of taking the form of a removable card, an eSIM is a much smaller chip that is permanently soldered onto the device. In addition, eSIMs support remote management, allowing an administrator to easily change the account/profile of a given device, or even migrate the device to a different cellular network.

iSIMs are an even newer technology that is still emerging. Like eSIMs, iSIMs are integrated directly into their devices and are non-swappable. iSIMs also support remote management, making them also ideal for use in IoT devices. In general, the main difference between an iSIM and an eSIM is their supporting hardware. While eSIMs typically require their own processors and other hardware components, increasing the hardware footprint of the device considerably, iSIMs are further integrated into the hardware of their devices, such as part of an overall system-on-chip solution for the device.

Leveraging the procurement, deployment, and the authentication processes of SIM/eSIM/iSIM/etc. to bootstrap ZTD would eliminate many friction points that exist in current cellular device onboarding processes. To initiate the onboarding, each device 302 may execute a ZTD agent that interfaces with the SIM/eSIM/iSIM/etc. of the device 302 to be onboarded.

Figure 4:
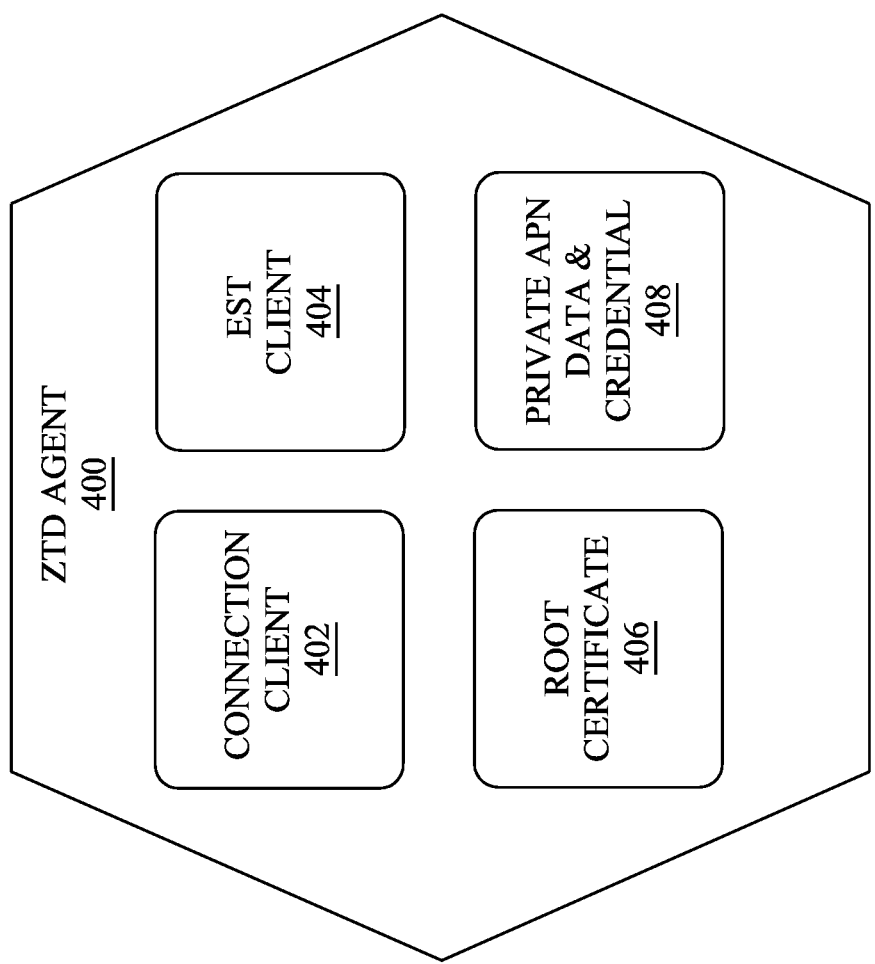
FIG. 4 illustrates an example ZTD agent.

FIG. 4 illustrates an example ZTD agent 400, according to various embodiments. As shown, ZTD agent 400 may include any or all of the following sub-components: a connection client 402, an Enrollment over Secure Transport (EST) client 404, a root certificate 406, and/or private APN data and credential 408. These sub-components 402-408 may be combined, omitted, or integrated into other processes, in various implementations.

Generally speaking, it is expected that ZTD agent 400 be installed to the endpoint device (e.g., a device 302 in FIG. 3) during its manufacture. In addition, a key aspect of ZTD agent 400 is that it can be used across any number of different end users/entities and deployments (e.g., companies, schools, governments, etc.) without requiring any customization specific to them. In addition, ZTD agent 400 also does not require the manufacturer to install any certificates, either.

Figure 3:
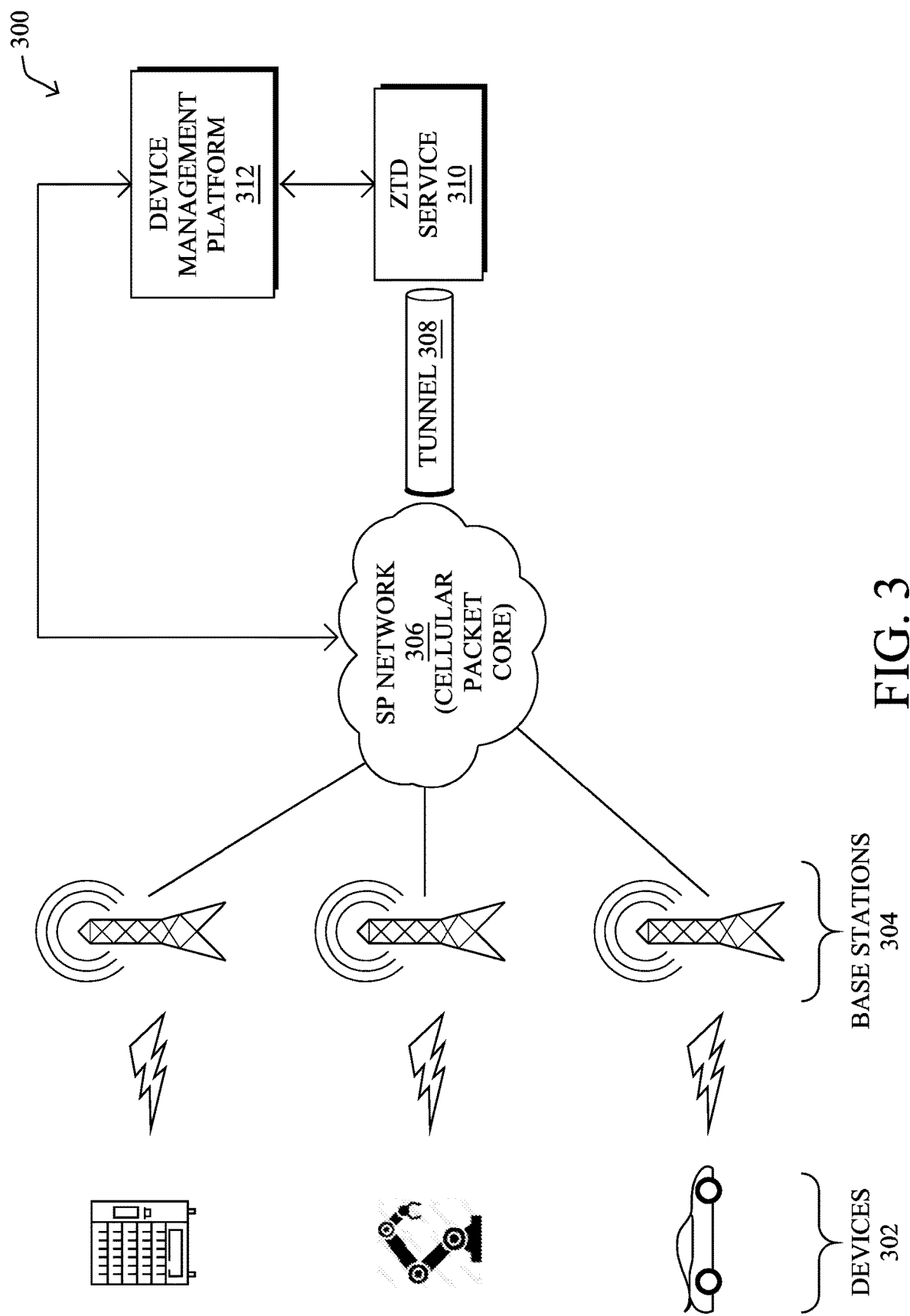
FIG. 3 illustrates an example architecture for the zero-touch deployment (ZTD) of endpoint devices.

During the onboarding process, connection client 402 is responsible for establishing the initial connection between the device executing ZTD agent 400 and the ZTD service. For example, as shown in FIG. 3, the connection client 402 executed by a device 302 may cause that device to connect with a corresponding base station 304 and send a registration request to ZTD service 310.

Likewise, EST client 404 is responsible for managing and requesting the installation of certificates to the device executing ZTD agent 400 that are associated with the entity that owns the device. Details on the EST protocol can be found in the Internet Engineering Task Force (IETF) Request for Comments 7030 entitled, "Enrollment over Secure Transport" by Pritiken, et al. In further embodiments, EST client 404 may instead take the form of another client sub-component of ZTD agent 400 that relies on another certificate management protocol.

Root certificate 406 is used by ZTD agent 400 to authenticate the executing device during its communications with its corresponding service. Such a certificate may be issued by a certificate authority (CA), in accordance with a public key infrastructure framework.

Finally, private APN data and credentials 408 is used by ZTD agent 400 to connect its device to a private APN operated by the cellular carrier and associated with the ZTD service. For example, as shown in FIG. 3, the ZTD agent of a device 302 may supply the private APN and credentials to the device, so that it can connect to an APN associated with the provider of ZTD service 310. This private APN allows the device 302 to access the cellular carrier's network 306 via a minimal data plan for purposes of onboarding the device 302. As a result, a secure tunnel 308 associated with the APN is formed with ZTD service 310. In various embodiments, network services such as Domain Name System (DNS) services, Dynamic Host Configuration Protocol (DHCP) services, and the like in network 306 can be controlled in this captive network.

From the standpoint of ZTD service 310, the above approach helps to ensure network security, as only allowed/known devices 302 (e.g., devices with known SIMs) can connect to ZTD service 310 through a corresponding tunnel 308 connecting the service provider (SP) network 306 to that of ZTD service 310. In various embodiments, the devices 302 are known via their SIM/eSIM/iSIM information, which is also known by the device management platform 312 via its SIM onboarding workflow.

Since devices 302 effectively connect to a private ZTD network using private APN and a virtual private network (VPN) tunnel 308, ZTD services from ZTD service 310 are not accessible from the public Internet. In addition, the original IP headers of packets sent by devices 302 to ZTD service 310 are not modified, such as by a network address translation (NAT) service. Also notable is that devices 302 themselves are not accessible by any service other than ZTD service 302 during the onboarding process, providing additional security.

In one embodiment, the cellular SP network 306 may be configured to work with both the private APN associated with ZTD service 310, as well as with a target APN. In another embodiment, the cellular SP network 306 may be reconfigured to allow the SIM/eSIM/iSIM/etc. of device 302 to switch to the target APN in an orchestrated manner during onboarding of the device 302.

Figure 5A:
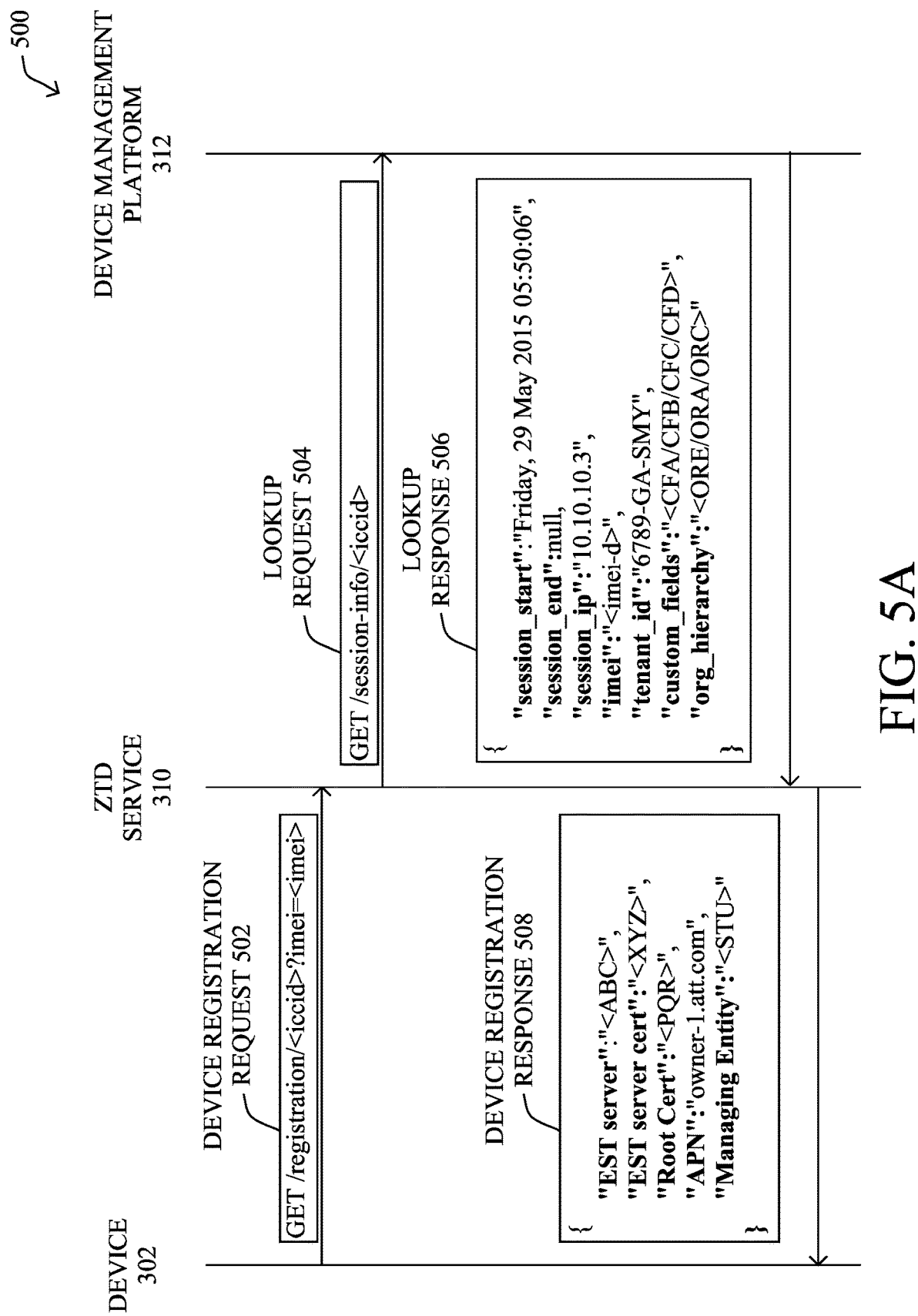
FIGS. 5A-5B illustrate example communications to register and onboard a device.
Figure 5B:
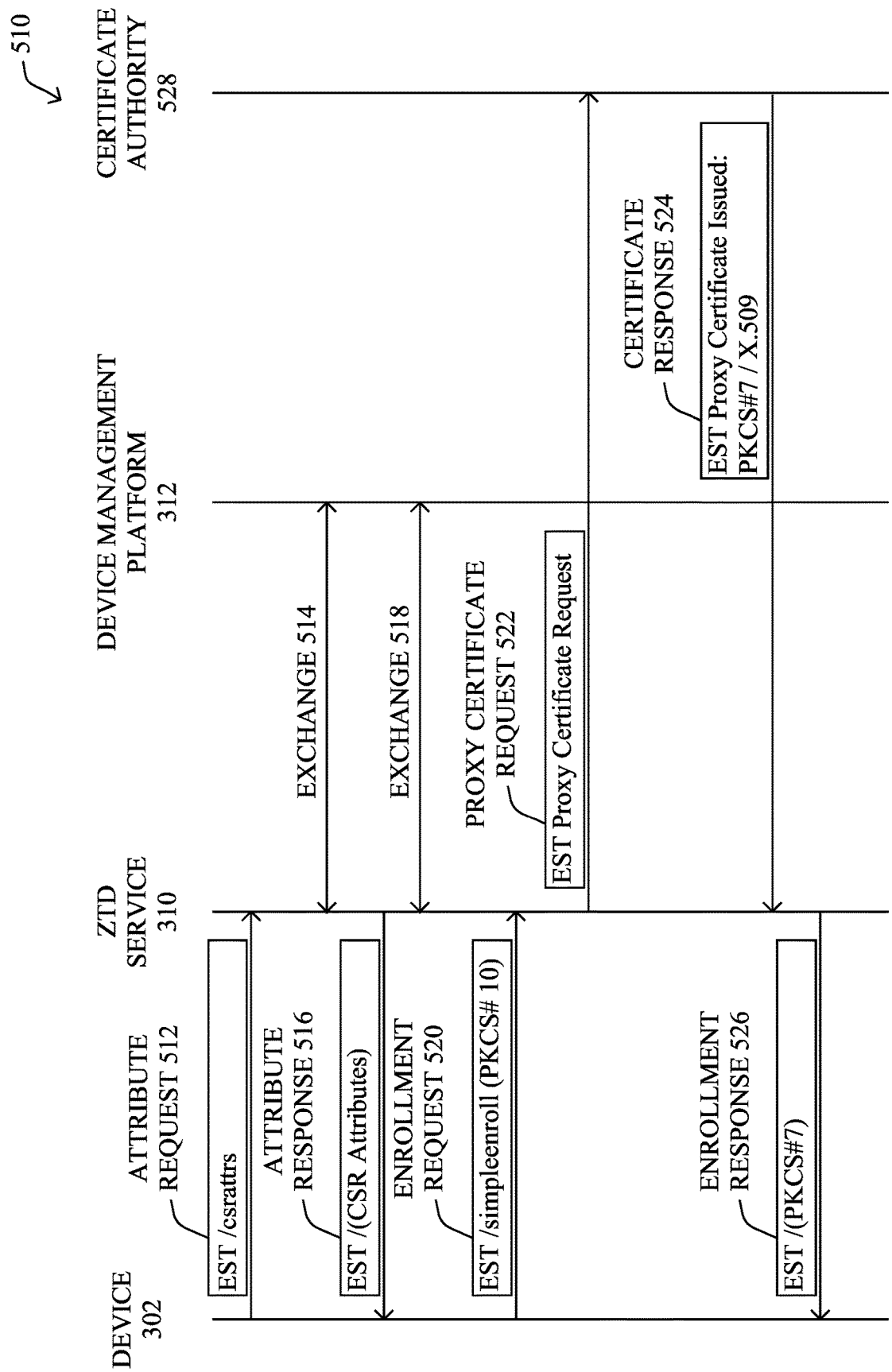

FIGS. 5A-5B illustrate example communications to register and onboard a device, according to various embodiments. More specifically, FIG. 5A illustrates an example communication diagram 500 showing the various communications between a device 302, ZTD service 310, and device management platform 312. Continuing the example of FIGS. 3-4, once the ZTD agent 400 of device 302 has formed a connection with ZTD service 310 via the private APN (and tunnel 308), its connection client 402 may send a device registration request 502 to ZTD service 310.

In various embodiments, device registration request 502 may indicate the integrated circuit card identifier (ICCID), international mobile equipment identity (IMEI), or other identifier associated with the SIM/eSIM/iSIM/etc. of device 302.

Based on the above, in one embodiment, the IP address of the (TLS) session between device 302 and ZTD service 310 is correlated to the session address allocated to the ICCID of device 302, such as an IP address <a,b,c,d>, to establish trust with device 302. Conversely, the ZTD root certificate 406 included in ZTD agent 400 allows device 302 to authenticate and trust ZTD service 310.

More specifically, in various embodiments, ZTD service 310 may issue a lookup request 504 to device management platform 312 that include any or all of the identification information included in device registration request 502, in response to ZTD service 310 receives device registration request 502. In turn, device management platform 312 may look up the information that it has about device 302 and return that information to ZTD service 310 via a lookup response 506. Indeed, since device management platform 312 is in communication with the cellular SP network 306 as part of the management of the private APN and VPN used by device 302, it has access to the network information associated with device 302.

By way of example, the lookup information in lookup response 506 may include any or all of the following:
- A session timestamp indicative of the day and time the session was started with device 302. (e.g., "session_start": "Friday 29 May 2015 05:50:06".
- A session end date and time (e.g., "session_end":"null").
- The session network address of device 302 (e.g., the IP address, as assigned by the cellular SP network 306 to device 302, such as "session_ip":"10.10.10.3.").
- The IMEI used by device 302 (e.g., "imei":"imei_d>").
- The tenant identifier for the tenant of device management platform 312 associated with device 302 (e.g., "tenant_id":"6789-GA-SMY"). In other words, in some embodiments, device management platform 312 may be a multi-tenant management service, with each tenant being a separate organization or other entity (e.g., the owner or operator of device 302).
- Any custom fields (e.g., "custom_fields":"<CFA/CFB/CFC/CFD>").
- Any organizational hierarchy information (e.g., "org_hierarchy":"<ORE/ORA/ORC>").

By providing lookup response 506 to ZTD service 310, ZTD service can use this information to verify the identity of device 302. For example, ZTD service 310 may verify that the IP address used in the header of device registration request 502 is indeed correlated with the ICCID and/or IMEI indicated by device 302 in device registration request 502.

In effect, the above mechanism creates a trust model between device 302, ZTD service 310, device management platform 312, and the cellular packet core, e.g., SP network 306). Notably, device management platform 312 trusts the SP network 306 and communicates therewith to obtain information about device 302 (e.g., its IP address, IMEI, etc.). Likewise, the home subscriber server (HSS)/home location register (HLR) mechanism of SP network 306 trusts the SIM/eSIM/iSIM/etc. and verifies device 302 as part of the assignment of a network address to device 302. Finally, if an encrypted connection is used between ZTD service 310 and device management platform 312, ZTD service 310 can also trust the information provided by device management platform 312 in lookup response 506.

Thus, by matching the information in lookup response 506 to the information that ZTD service 310 knows about device 302 (e.g., its ICCID, its network address, etc.), ZTD service 310 can trust that device 302 is actually a device authorized to be registered and onboarded.

In further embodiments, the authentication of device 302 by ZTD service 310 can also be based in part on location information regarding device 302. For example, if the deployment location for device 302 is known in advance (e.g., a particular building, etc.), location information can be included in device registration request 502, to ensure that the device attempting onboarding is actually the deployed device 302. Such information may take the form of a named location, a Global Positioning System (GPS) coordinate, or the like.

As noted, many implementations provide for device management platform 312 to be a multi-tenant system, whereby each tenant can use device management platform 312 to manage its own set of devices 302 separately and distinctly from that of other tenants. To do so, once ZTD service 310 has authenticated device 302 using the information in lookup response 506, it may use the returned tenant identifier to determine the appropriate configuration for device 302. In turn, ZTD service 310 may send a device registration response 508 to device 302 that includes this tenant-specific information. In other words, ZTD service 310 may further leverage existing metadata information in the cellular connection management processes, by using them in policies for zero touch deployment to choose items such as certificate authority, type of certificates, the target APN, IoT service-related information, etc.

By way of example, as shown in FIG. 5A, device registration response 508 may include any or all of the following information:
- The identity of the EST server that device 302 should use (e.g., "EST server":"<ABC>").
- The certificate for the EST server (e.g., "EST server cert":"<XYZ>").
- The root certificate (e.g., "Root Cert":"<PQR>").
- The target APN (e.g., "APN":"owner-1.att.com").
- The managing entity (e.g., "Managing Entity":"<STU>").

FIG. 5B illustrates an example communication diagram 510 for the issuance of a certificate to device 302 by a certificate authority 528, according to various embodiments. In some embodiments, as shown, such a transaction may leverage the EST protocol, thereby allowing the tenant-specific certificate(s) to be installed to device 302 as part of the onboarding process. In other embodiments, other certificate management protocols could be used.

As shown, device 302 may begin by sending an attribute request 512 to ZTD service 310. In turn, ZTD service 310 may perform an exchange 514 with data management platform 312, to obtain the relevant certificate signing request (CSR) attributes for the tenant associated with device 302. Such an exchange may be performed in response to attribute request 512 or may be pre-fetched by ZTD service 310.

Once ZTD service 310 has obtained the CSR attributes via exchange 514, it may send attribute response 516 to device 302 with those attributes listed. ZTD service 310 may continue to perform exchanges with device management platform 312, during this time. Then, based on attribute response 516, device 302 may send an enrollment request 520.

In response to enrollment request 520, ZTD service 310 may send a proxy certificate request 522 to certificate authority 528 on behalf of device 302. In turn, certificate authority 528 may issue a certificate and send the certificate to ZTD service 310 via a certificate response 524. ZTD service 310 then forwards this certificate on to device 302 via an enrollment response 526. In this manner, device 302 can be configured with the specific certificate information associated with its tenant.

Figure 6:
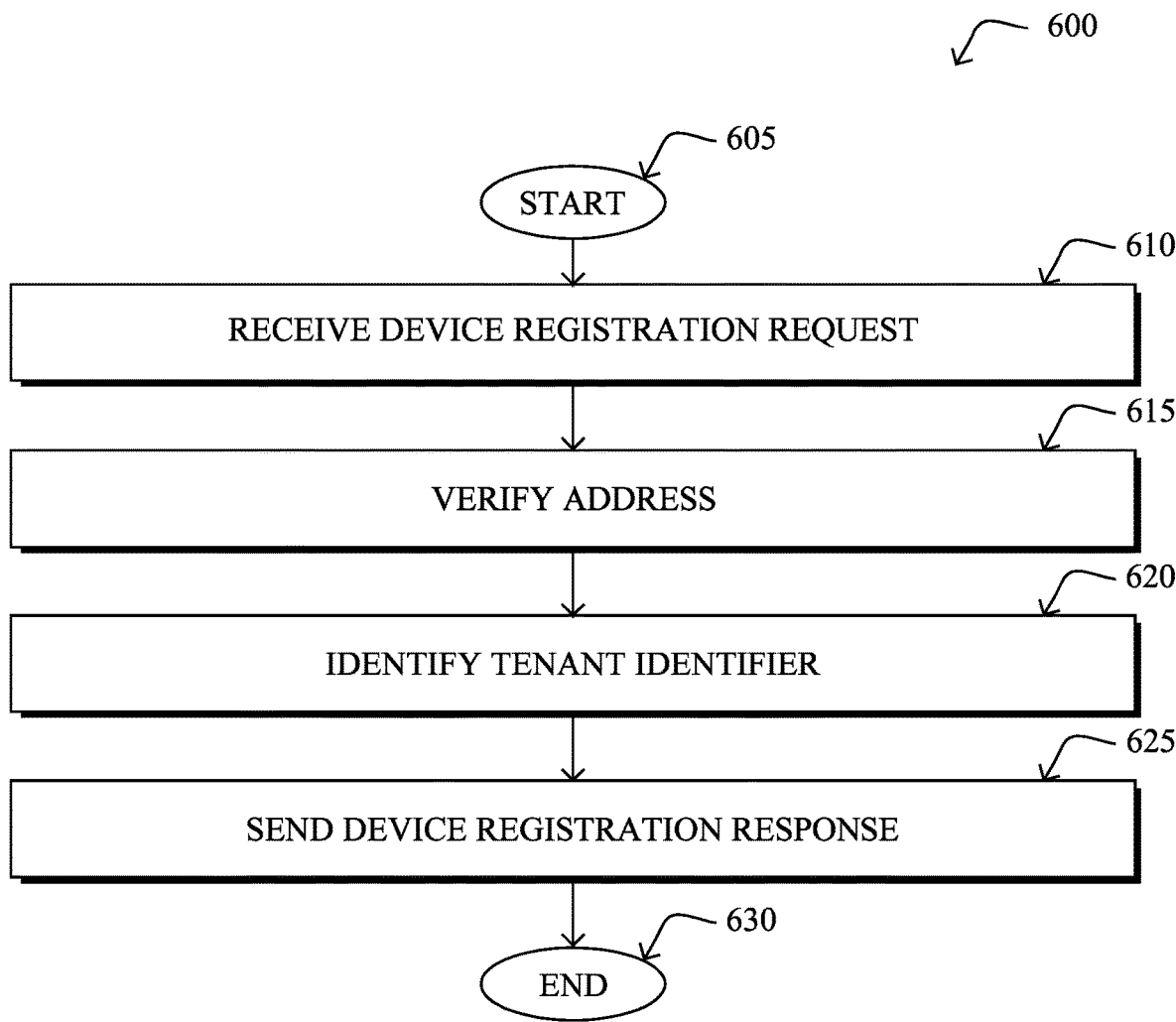
FIG. 6 illustrates an example simplified procedure for registering an endpoint device.

FIG. 6 illustrates an example simplified procedure for registering an endpoint device, in accordance with one or more embodiments described herein. For example, a non-generic, specifically configured device (e.g., device 200) may perform procedure 600 by executing stored instructions (e.g., process 248), so as to provide a ZTD service to an endpoint device. The procedure 600 may start at step 605, and continues to step 610, where, as described in greater detail above, the service may receive a device registration request sent by the endpoint device. In various embodiments, the endpoint device may execute an onboarding agent (e.g., ZTD agent 400) that causes the device to send the request via a cellular connection to a private APN associated with the service. Accordingly, in various embodiments, the request may be sent to the service via a VPN tunnel and may, in some embodiments, include an IP address that is not translated between the endpoint device and the service.

At step 615, as detailed above, the service may verify that a network address of the endpoint device from which the device registration request was sent is associated with an ICCID or IMEI indicated by the device registration request. In various embodiments, the service may leverage information registered about the SIM/eSIM/iSIM/etc. of the device, as well as information from the cellular network (e.g., as obtained either directly or via a management platform), to verify that the device is authorized to be registered/onboarded. In some embodiments, this step may also be performed based in part on a location of the endpoint device that was indicated by the registration request.

At step 620, the service may identify a tenant identifier associated with the ICCID or IMEI, as described in greater detail above. As noted, management of the endpoint device, as well as other IoT device, may be performed via a multi-tenant platform. Accordingly, the service may obtain the tenant identifier for the tenant of that platform that owns, or otherwise operates, the endpoint device.

At step 625, as detailed above, the service may send, based on the tenant identifier, a device registration response to the endpoint device via the private APN. In some embodiments, such a response may identify an EST server to which the endpoint device should connect. In a further embodiment, the registration response may also identify a target APN via which the endpoint device should communicate (e.g., a tenant-associated APN, as opposed to the private APN used for ZTD). Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a cellular IoT device to be deployed and onboarded in a simple manner that does not require complex, manual configuration at the time of deployment or require the manufacturer to install certificate information specific to the owner or operator of the device.

While there have been shown and described illustrative embodiments that provide for ZTD of a cellular IoT device, it is to be understood that various other adaptations and modifications may be made within the spirit and scope of the embodiments herein. For example, while certain protocols are listed herein for illustrative purposes, other suitable protocols could also be used to implement the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a service, a device registration request sent by an endpoint device, wherein the endpoint device executes an onboarding agent that causes the endpoint device to send the device registration request via a cellular connection to a private access point name (APN) associated with the service;
verifying, by the service, that a network address of the endpoint device from which the device registration request was sent is associated with an integrated circuit card identifier (ICCID) or international mobile equipment identity (IMEI) indicated by the device registration request;
identifying, by the service, a tenant identifier associated with the ICCID or IMEI; and
sending, by the service and based on the tenant identifier, a device registration response to the endpoint device via the private APN,
wherein the device registration response identifies an Enrollment over Secure Transport (EST) server to which the endpoint device should connect.

2. The method as in claim 1, further comprising:
receiving, at the service, an EST request from the endpoint device indicative of the EST server;
sending, by the service, a proxy EST request to the EST server; and
sending, by the service, an EST certificate issued by the EST server to the endpoint device.

3. The method as in claim 1, wherein the device registration response identifies a target APN via which the endpoint device should communicate.

4. The method as in claim 1, further comprising:
authenticating, by the service, the endpoint device based in part on a location of the endpoint device indicated by the device registration request.

5. The method as in claim 1, wherein the network address of the endpoint device is an Internet Protocol (IP) address that is not translated between the endpoint device and the service.

6. The method as in claim 1, wherein the service receives the device registration request via a virtual private network (VPN) tunnel.

7. The method as in claim 1, wherein the tenant identifier is associated with a device management platform.

8. An apparatus, comprising:
one or more network interfaces;
a processor coupled to the one or more network interfaces and configured to execute one or more processes; and
a memory configured to store a process that is executable by the processor, the process when executed configured to:
receive a device registration request sent by an endpoint device, wherein the endpoint device executes an onboarding agent that causes the endpoint device to send the device registration request via a cellular connection to a private access point name (APN) associated with the apparatus;
verify that a network address of the endpoint device from which the device registration request was sent is associated with an integrated circuit card identifier (ICCID) or international mobile equipment identity (IMEI) indicated by the device registration request;
identify a tenant identifier associated with the ICCID or IMEI; and
send, based on the tenant identifier, a device registration response to the endpoint device via the private APN,
wherein the device registration response identifies an Enrollment over Secure Transport (EST) server to which the endpoint device should connect.

9. The apparatus as in claim 8, wherein the process when executed is further configured to:
receive an EST request from the endpoint device indicative of the EST server;
send a proxy EST request to the EST server; and
send an EST certificate issued by the EST server to the endpoint device.

10. The apparatus as in claim 8, wherein the device registration response identifies a target APN via which the endpoint device should communicate.

11. The apparatus as in claim 8, wherein the process when executed is further configured to:
authenticate the endpoint device based in part on a location of the endpoint device indicated by the device registration request.

12. The apparatus as in claim 8, wherein the network address of the endpoint device is an Internet Protocol (IP) address that is not translated between the endpoint device and the apparatus.

13. The apparatus as in claim 8, wherein the apparatus receives the device registration request via a virtual private network (VPN) tunnel.

14. A tangible, non-transitory, computer-readable medium storing program instructions that cause a service to execute a process comprising:
receiving, at the service, a device registration request sent by an endpoint device, wherein the endpoint device executes an onboarding agent that causes the endpoint device to send the device registration request via a cellular connection to a private access point name (APN) associated with the service;
verifying, by the service, that a network address of the endpoint device from which the device registration request was sent is associated with an integrated circuit card identifier (ICCID) or international mobile equipment identity (IMEI) indicated by the device registration request;
identifying, by the service, a tenant identifier associated with the ICCID or IMEI; and sending, by the service and based on the tenant identifier, a device registration response to the endpoint device via the private APN,
wherein the device registration response identifies an Enrollment over Secure Transport (EST) server to which the endpoint device should connect.

15. The computer-readable medium as in claim 14, wherein the process further comprises:
receiving, at the service, an EST request from the endpoint device indicative of the EST server;
sending, by the service, a proxy EST request to the EST server; and
sending, by the service, an EST certificate issued by the EST server to the endpoint device.

16. The computer-readable medium as in claim 14, wherein the device registration response identifies a target APN via which the endpoint device should communicate.

17. The computer-readable medium as in claim 14, wherein the process further comprises:
authenticating, by the service, the endpoint device based in part on a location of the endpoint device indicated by the device registration request.

* * * * *